US010236707B2

(12) United States Patent
Shin et al.

(10) Patent No.: US 10,236,707 B2
(45) Date of Patent: Mar. 19, 2019

(54) CHARGING SYSTEM USING WOUND ROTOR SYNCHRONOUS MOTOR

(71) Applicants: HYUNDAI MOTOR COMPANY, Seoul (KR); KIA Motors Corporation, Seoul (KR); Seoul National University R&DB Foundation, Seoul (KR)

(72) Inventors: Ho Joon Shin, Uiwang-si (KR); Mu Shin Kwak, Osan-si (KR); Sung Kyu Kim, Bucheon-si (KR); Young Kook Lee, Seoul (KR); Jung Ik Ha, Seoul (KR); Yong Jae Lee, Seosan-si (KR); Yong Su Han, Daejeon (KR)

(73) Assignees: HYUNDAI MOTOR COMPANY, Seoul (KR); KIA Motors Corporation, Seoul (KR); Seoul National University R&DB Foundation, Seoul (KR)

( * ) Notice: Subject to any disclaimer, the term of this patent is extended or adjusted under 35 U.S.C. 154(b) by 39 days.

(21) Appl. No.: 15/382,415

(22) Filed: Dec. 16, 2016

(65) Prior Publication Data
US 2018/0115181 A1 Apr. 26, 2018

(30) Foreign Application Priority Data
Oct. 26, 2016 (KR) .......................... 10-2016-0140224

(51) Int. Cl.
*H02J 7/02* (2016.01)
*B60L 11/18* (2006.01)
(Continued)

(52) U.S. Cl.
CPC ................ *H02J 7/022* (2013.01); *H02J 3/18* (2013.01); *H02J 7/0027* (2013.01);
(Continued)

(58) Field of Classification Search
CPC .. H02J 7/02; H02J 7/022; H02J 7/0027; H02J 7/0068; H02J 3/18; H02P 6/32;
(Continued)

(56) References Cited

U.S. PATENT DOCUMENTS 6,794,776 B1\* 9/2004 Gabrys .................. H02K 7/025
310/209
8,013,553 B2\* 9/2011 Taniguchi ............... H02P 25/22
318/400.27
(Continued)

FOREIGN PATENT DOCUMENTS

JP  2000-60004 A  2/2000
KR  10-2013-0068411 A  6/2013
(Continued)

OTHER PUBLICATIONS

Office Action of corresponding Korean Patent Application No. 10-2016-0140224—7 pages, (dated Jun. 11, 2018).

*Primary Examiner* — Rexford Barnie
*Assistant Examiner* — Terrence Willoughby
(74) *Attorney, Agent, or Firm* — Knobbe Martens Olson & Bear LLP

(57) ABSTRACT

Disclosed herein is a charging system using a wound rotor synchronous motor (WRSM), capable of reducing volume, weight, and cost of a vehicle increased due to an on-board charging circuit and increasing a battery charge capacity. The charging system using a wound rotor synchronous motor (WRSM) includes an inverter converting power of a battery into alternating current (AC) powers having a plurality of different phases, a WRSM having a plurality of stator coils each receiving AC power of a different phase and a field coil forming mutual inductance with the plurality of stator coils and installed in a rotor to form a magnetic flux using power of the battery, and a controller controlling the
(Continued)

battery side and the field coil side are insulated from each other in a charge mode in which grid power is applied to the field coil side of the WRSM.

10 Claims, 9 Drawing Sheets

(51) Int. Cl.
    *H02J 3/18*     (2006.01)
    *H02J 7/00*     (2006.01)
    *H02K 1/14*     (2006.01)
    *H02K 1/26*     (2006.01)
    *H02K 19/12*     (2006.01)
    *H02P 23/14*     (2006.01)
    *H02P 27/06*     (2006.01)
    *H02P 6/32*     (2016.01)
    *H02P 101/45*     (2016.01)

(52) U.S. Cl.
    CPC .............. *H02J 7/0068* (2013.01); *H02K 1/14* (2013.01); *H02K 1/26* (2013.01); *H02K 19/12* (2013.01); *H02P 6/32* (2016.02); *H02P 23/14* (2013.01); *H02P 27/06* (2013.01); *H02P 2101/45* (2015.01)

(58) Field of Classification Search
    CPC ...... H02P 27/06; H02P 23/14; H02P 2101/45; H02K 1/14; H02K 19/12; H02K 1/26; B60L 11/1811; B60L 11/1814; B60L 2220/54; Y02T 10/7005; Y02T 10/7072; Y02T 90/127; Y02T 90/14; Y02T 29/49002; Y02T 307/707
    USPC ......................................................... 307/9.1
    See application file for complete search history.

(56) References Cited

U.S. PATENT DOCUMENTS

| | | | |
|---|---|---|---|
| 9,843,278 B2* | 12/2017 | Toba | H02P 6/14 |
| 2007/0153560 A1* | 7/2007 | Zhang | B60L 11/1811 363/166 |
| 2011/0050174 A1* | 3/2011 | King | B60L 11/1811 320/134 |
| 2013/0069492 A1* | 3/2013 | Rippel | H02J 7/045 310/68 D |
| 2016/0152151 A1* | 6/2016 | Yang | B60L 11/1812 320/109 |

FOREIGN PATENT DOCUMENTS

| | | |
|---|---|---|
| KR | 10-2014-0071593 A | 6/2014 |
| KR | 10-2015-0002093 A | 1/2015 |
| KR | 10-2016-0010158 A | 1/2016 |

* cited by examiner

CHARGING SYSTEM USING WOUND ROTOR SYNCHRONOUS MOTOR

CROSS REFERENCE TO RELATED APPLICATION

This application claims the benefit of Korean Patent Application No. 10-2016-0140224, filed on Oct. 26, 2016, entitled "Damping Apparatus of Shifting Cable for Vehicle", which is hereby incorporated by reference in its entirety into this application.

BACKGROUND

1. Field

The present disclosure relates to a charging system for charging batteries of a vehicle.

2. Description of the Related Art

As issues such as global warming, environmental pollution, and the like, have emerged, research into development of eco-friendly vehicles capable of minimizing environmental pollution has been actively conducted in an automobile industrial field and market thereof has gradually expanded. Electric vehicles, hybrid vehicles, and plug-in hybrid vehicles, as eco-friendly vehicles or green vehicles, employing a motor generating a driving force using electric energy, instead of an engine generating a driving force by burning existing fossil fuel, have been released worldwide. Eco-friendly vehicle technologies using electric energy mostly charge a battery provided therein from a grid to utilize the battery to drive a motor. Thus, eco-friendly vehicles using electric energy require an on-board charging circuit for charging electric energy provided from the grid in the battery.

An on-board charging circuit, an essential circuit for charging a battery of an eco-friendly vehicle, may be implemented using various topologies but most on-board charging circuits are implemented by a high frequency transformer and filter for insulation, a plurality of switching elements, and control module. Thus, since the eco-friendly vehicle further separately includes an on-board charging circuit, cost and a volume of a vehicle are inevitably increased. In particular, since a transformer provided in an on-board charging circuit uses a magnetic circuit, a size of the transformer is increased according to capacity and the transformer requires a large weight and volume.

Thus, various research and development are required to reduce volume, weight, and cost of a vehicle increased by an on-board charging circuit provided in an eco-friendly vehicle in the art.

The disclosure of this section is to provide background of the invention. Applicant notes that this section may contain information available before this application. However, by providing this section, Applicant does not admit that any information contained in this section constitutes prior art.

SUMMARY

An aspect of the present invention is to provide a charging system using a wound rotor synchronous motor, capable of reducing volume, weight, and cost of a vehicle increased due to an on-board charging circuit and increasing a battery charge capacity.

According to an embodiment of the present invention, there is provided a charging system using a wound rotor synchronous motor (WRSM), including: an inverter converting power of a battery into alternating current (AC) powers having a plurality of different phases; a WRSM having a plurality of stator coils each receiving AC power of a different phase and a field coil forming mutual inductance with the plurality of stator coils and installed in a rotor to form a magnetic flux using power of the battery; and a controller controlling the battery side and the field coil side to be insulated from each other in a charge mode in which grid power is applied to the field coil side of the WRSM.

In the case of rotatably driving the WRSM, the controller may control the battery and the field coil to be electrically connected.

In the charge mode, the controller may control the battery side and the field coil side to be insulated from each other so as to prevent charging power from being supplied to the battery through the field coil, and control the inverter to allow the grid power to be transferred from the field coil to the plurality of stator coils to charge the battery.

In the charge mode, the controller may derive a charge power reference value for charging the battery with reference to a voltage of the battery, derive an input power reference value on the basis of an error between supply power actually supplied to the battery and the power reference value, derive a sine component of an input current reference value input to the field coil by applying a maximum grid voltage value to the input power reference value, derive a sine component of a d-axis current reference value of the stator coil side on the basis of an error between the input current reference value and the sine component of the actually input current and derive a cosine component of the d-axis current reference value of the stator coil side on the basis of an error between 0 and a cosine component of a current input to the field coil, derive a d-axis current reference value of the stator coil side on the basis of the sine component and the cosine component of the d-axis current reference value of the stator coil side and a phase angle of the grid power, derive a d-axis voltage reference value and a q-axis voltage reference value of the stator coil side on the basis of the d-axis current reference value and a q-axis current reference value of the stator coil side having a value 0, derive a 3-phase voltage reference value $V^*_{abcs}$ by converting the d-axis voltage reference value and the q-axis voltage reference value, and control an ON/OFF duty of a switching element of the inverter to output the 3-phase voltage reference value $V^*_{abcs}$.

In the charge mode, the controller may derive a charge power reference value for charging the battery with reference to a voltage of the battery, derive an input power reference value $P^*_{in}$ on the basis of an error between supply power actually supplied to the battery and the power reference value, calculate a sine component $I^*_{dss}$ and a cosine component $I^*_{dsc}$ of the d-axis current reference value of the stator coil side using a following equation, $$I_{dss} = -\frac{L'_f P_{in}}{L_m \left\{\frac{3}{2}\frac{1}{2}E_f\right\}},$$

$$I_{dsc} = \frac{R'_f P_{in} / \left\{\frac{3}{2}\frac{1}{2}E_f\right\} - E_f}{\omega_g L_m}$$ [Equation]

where $L'_f = (3/2)*(n_s/n_f)^2$, $n_s$: number of turns of the field coil, $L_m$: mutual inductance between d-axis of the stator and the field coil viewed from the stator side, $E_f$: converted value obtained by converting a maximum voltage value of the grid into the stator terminal, and $\omega_g$ is an angular velocity of grid power, derive a d-axis current reference value of the stator coil side on the basis of the sine component and the cosine component of the d-axis current reference value of the stator coil side and the phase angle of the grid power, derive a d-axis voltage reference value and a q-axis voltage reference value of the stator coil side on the basis of the d-axis current reference value and the q-axis current reference value of the stator coil side having a value 0, derive a 3-phase voltage reference value $V^*_{abcs}$ by converting the d-axis voltage reference value and the q-axis voltage reference value into a 3-phase voltage, and control an ON/OFF duty of a switching element of the inverter to output the 3-phase voltage reference value $V^*_{abcs}$.

The charging system may further include: a rectifying circuit unit rectifying the grid power and a switching circuit unit converting an output from the rectifying circuit unit into an alternating current (AC) signal having a predetermined frequency and providing the converted AC signal to the field coil.

The grid power may be directly applied to both ends of the field coil.

The charging system may further include: a power factor compensation circuit unit compensating for a power factor of the grid power; and a switching circuit unit converting an output from the power factor compensation circuit unit into an AC signal having a predetermined frequency and providing the converted AC signal to the field coil.

According to another embodiment of the present invention, there is provided a charging system using a wound rotor synchronous motor (WRSM), including: an inverter selectively operated to convert power of a battery to output a plurality of alternating current (AC) powers having different phases or to convert a plurality of AC powers to output power to the battery; a WRSM having a plurality of stator coils receiving a plurality of AC powers having different phases from the inverter and a field coil installed in a stator to form mutual inductance with the plurality of stator coils; a switch unit selectively electrically connecting or disconnecting the battery and the field coil; and a controller controlling ON/OFF state of the switch unit, wherein, in the case of driving the WRSM, the controller adjusts the switch unit to an ON state to drive the WRSM using a magnetic flux generated in the field coil by power from the battery, and in the case of charging the battery by applying grid power to the field coil, the controller adjusts the switch unit to an OFF state to allow the grid power to be transferred to the stator coil from the field coil.

In the case of charging the battery, the controller may control a plurality of switching elements included in the inverter to provide power to the battery.

DESCRIPTION OF THE EMBODIMENTS

Hereinafter, a charging system using a wound rotor synchronous motor (WRSM) according to various embodiments of the present invention will be described with reference to the accompanying drawings.

Figure 1:
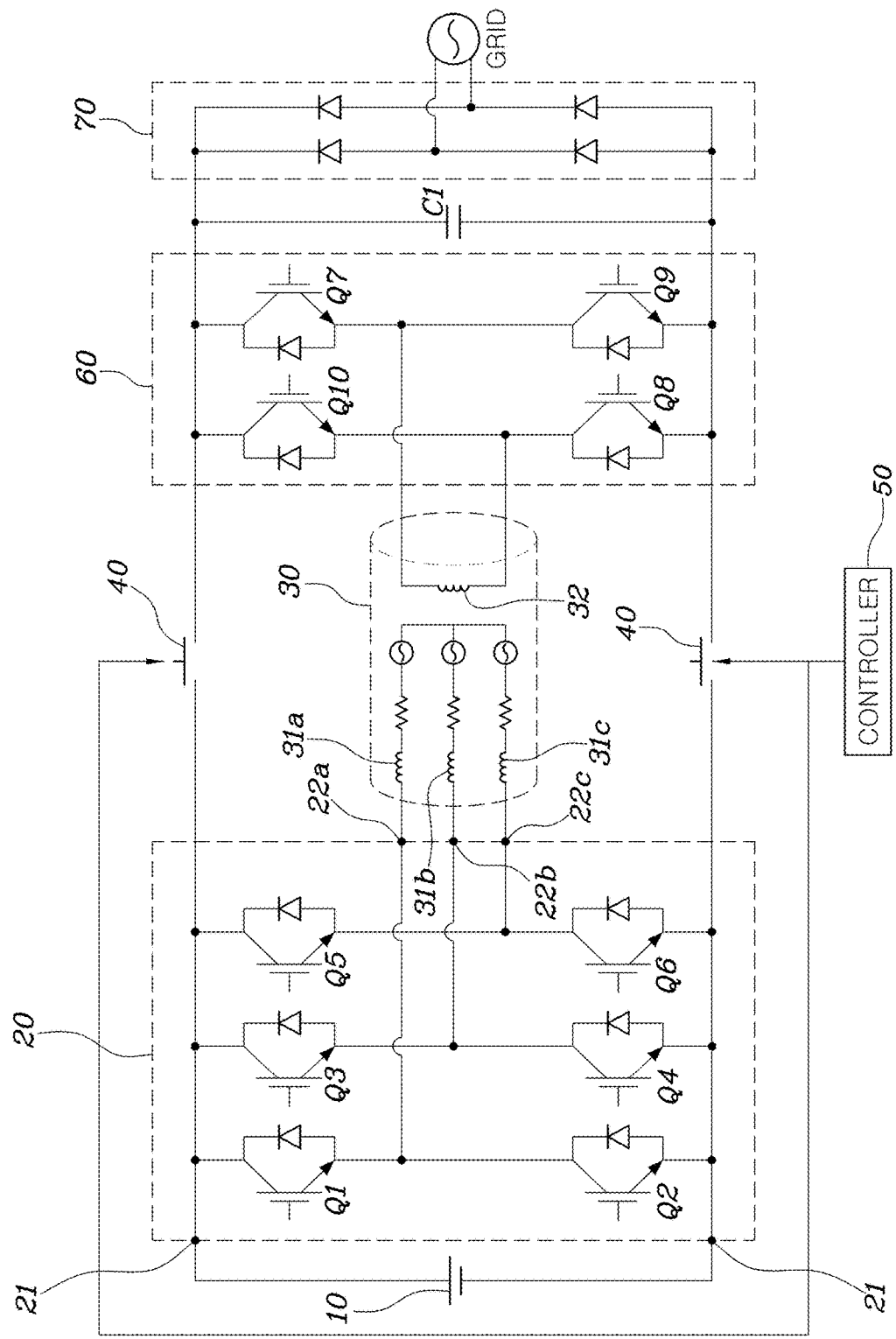
FIG. 1 is a circuit diagram illustrating a charging system using a wound rotor synchronous motor (WRSM) according to an embodiment of the present invention.

FIG. 1 is a circuit diagram illustrating a charging system using a WRSM according to an embodiment of the present invention.

Referring to FIG. 1, a charging system using a WRSM according to an embodiment of the present invention may include one or more batteries 10, an inverter 20, a WRSM 30, a switch unit 40, and a controller 50.

The battery 10 is an energy storage device supplying electric power for driving a motor in a green vehicle (or an eco-friendly vehicle) having the motor generating driving power to rotate wheels of an electric vehicle, a plug-in hybrid vehicle, and the like. The battery 10 applied to a green vehicle is discharged when the motor is driven, and charged upon receiving electric power from an external system.

The inverter or inverter circuit 20 is a two-way inverter selectively operated to convert electric power from the battery 10 to output a plurality of AC powers of different phases, or to convert a plurality of AC powers to output electric power to the battery 10.

The inverter 20 may have a first input/output terminal 21 connected to the battery 10 and second input/output terminals 22a, 22b, and 22c connected to the motor 30. In the case of driving the motor 30, the inverter 20 receives power from the battery 10 by the first input/output terminal 21, converts the received power into AC power having a plurality of phases using switching elements Q1 to Q6, and outputs the converted AC power to each of the plurality of the second input/output terminals 22a, 22b, and 22c. In general, a technique of driving a motor using three-phase power having a phase difference of 120 degrees to each other is applied, and thus, various embodiments of the present disclosure will be described on the basis of the inverter 30 performing 3-phase power conversion and a 3-phase motor 30.

The WRSM 30 may have a rotor including a plurality of stator coils 31a, 31b, and 31c receiving a plurality of AC powers having different phases from the inverter 20 and a field coil 32 forming mutual inductance with the plurality of stator coils 31a, 31b, and 31c to magnetically coupled thereto.

The WRSM 30 features directly controlling magnetic flux by applying the field coil 32. Through magnetic flux controlling, the WRSM 30 may manifest a high torque output in a middle/low speed area of a vehicle, like a permanent magnet type synchronous motor, and since the WRSM 30 may have characteristics appropriate for high speed operation like an induction motor, it is appropriate as a motor applied to a green vehicle.

The WRSM 30 has an arm able to provide power from the battery 10 to the field coil 32 in order to control magnetic flux of the field coil 32.

Various embodiments of the present disclosure have a switch unit or switch circuit 40 selectively electrically connecting or disconnecting the battery 10 and the field coil 32 in order to use the WRSM 30 also to charge the battery 10.

An ON/OFF state (or closed/open state) of the switch unit 40 may be controlled by the controller 50. In embodiments, in the case of driving the WRSM 30 to drive a vehicle, the controller 50 adjusts the switch unit 40 to an ON state (or closed state) to drive the WRSM 30 using a magnetic flux generated in the field coil 32 by power from the battery 10, and in the case of charging the battery 10 by applying grid power to the field coil 32, the controller 50 adjusts the switch unit 40 to an OFF state to allow grid power to be transferred from the field coil 32 to the stator coils 31a, 31b, and 31c by mutual inductance to thus charge the battery 10. In various embodiments of the present disclosure, driving the motor and charging the battery are distinguished from each other, and in the case of driving the motor, the switch unit 40 may cause the field coil 32 to form a magnetic flux for driving the motor, and in the case of charging the battery 10 by connecting a grid, the switch unit 40 serves to electrically disconnect the battery 10 and the grid.

In FIG. 1, reference numeral "60" denotes a sort of single-phase output inverter for providing AC power to the field coil 32, which may be implemented by a plurality of switching elements Q7 to Q10. Also, reference numeral "70" denotes a rectifying circuit for rectifying grid power.

In FIG. 1, the switching elements Q1 to Q10 provided in the inverter 20 and a full bridge circuit or an inverter circuit 60 may be controlled to be appropriately turned on or off to drive the WRSM 30 or charge the battery 10, and here, the switching elements Q1 to Q10 may be controlled by the controller 50 illustrated in FIG. 1. The controller 50 illustrated in FIG. 1 may be understood as a comprehensive element performing various calculations required for controlling an operation of the WRSM 30 and providing a command signal according to the calculation results to an element required to be controlled, as well as controlling the switch unit 40.

In an embodiment of the present invention illustrated in FIG. 1, in the case of charging the battery 10, first, the controller 50 controls the switch unit 40 to be open and connects the grid. Then, a grid voltage rectified by the rectifying unit 70 is applied to the inverter 60 adjacent to the field coil 32. Here, when a capacitor having a sufficiently small capacitance is applied as a DC link capacitor C1, a voltage (having a frequency double a frequency of a grid voltage), which is the same as a voltage obtained by taking an absolute value of the grid voltage, is applied to the inverter 60 adjacent to the field coil 32. In order to satisfy a power factor condition of the grid, a current having the same frequency as that of the grid should flow in the field coil 32, and here, a desired frequency may be generated by appropriately controlling the switching elements Q7 to Q10 of the inverter 60 adjacent to the field coil 32.

When AC power is applied to the field coil 32, a current is induced to the stator coils 31a to 31c forming mutual inductance with the field coil 32, and the induced power is converted by appropriately controlling the switching elements Q1 to Q6 of the inverter 20 and provided to the battery 10 to charge the battery 10.

Figure 2:
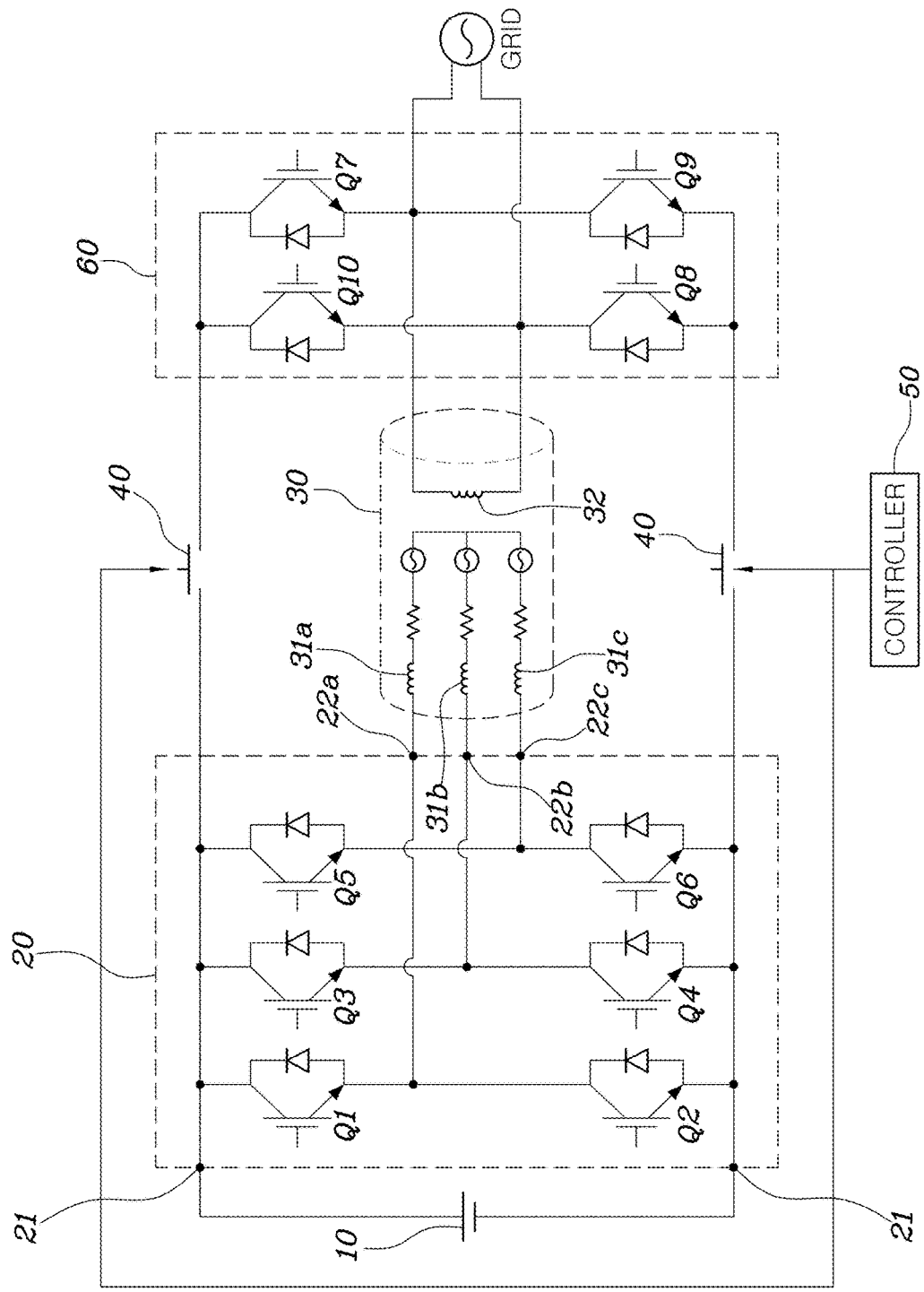
FIGS. 2 and 3 are circuit diagrams illustrating a charging system using a WRSM according to various embodiments of the present invention.
Figure 3:
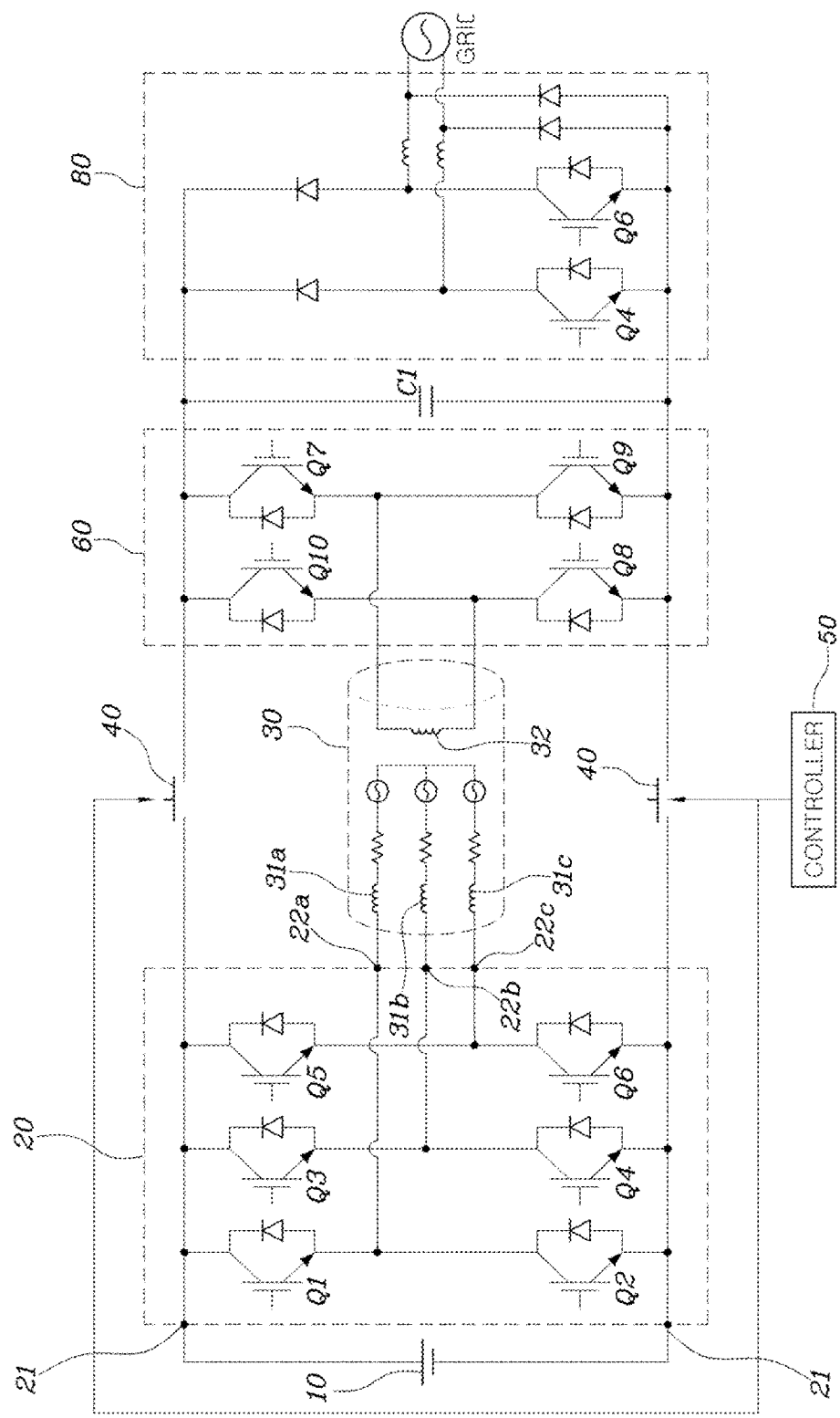

FIGS. 2 and 3 are circuit diagrams illustrating a charging system using a WRSM according to various embodiments of the present invention.

An embodiment of the present disclosure illustrated in FIG. 2 has a structure in which a grid is directly connected to the field coil 32 of the WRSM 30 without passing through a rectifying circuit. This embodiment may be implemented when mutual inductance between the field coil 32 and the stator coils 31a to 31c is sufficiently large. In the embodiment of the present disclosure illustrated in FIG. 2, a rectifying circuit, a capacitor, and the like, may be eliminated, and thus, system components may be further reduced to reduce manufacturing cost, compared with the embodiment of FIG. 1.

In the embodiments of FIGS. 1 and 2, the grid voltage is input in the same form to the rotor, and thus, in order to satisfy a grid regulation (power factor), power pulsation of a double frequency of the grid should be transferred to the battery. This is because an action of a filter circuit (capacitor) suppressing pulsation in a process of transferring power from the grid to the battery 10 is designed to be small.

An embodiment of the present disclosure illustrated in FIG. 3 has a structure in which a capacitor C2 having a relatively large capacitance and a power factor compensation circuit 80 are provided between the field coil 32 and the grid.

In the embodiments of FIG. 3, since pulsation of grid power is refined at the front stage of the field coil 32 using the capacitor C2 having a relatively large capacitance and the power factor compensation circuit 90, power transferred to the battery 10 through the field coil 32 may not include pulsation. Also, since a frequency applied to the field coil 32 is set as desired by controlling the inverter 60 adjacent to the field coil 32, the structure may be advantageous in terms of system design.

Figure 4:
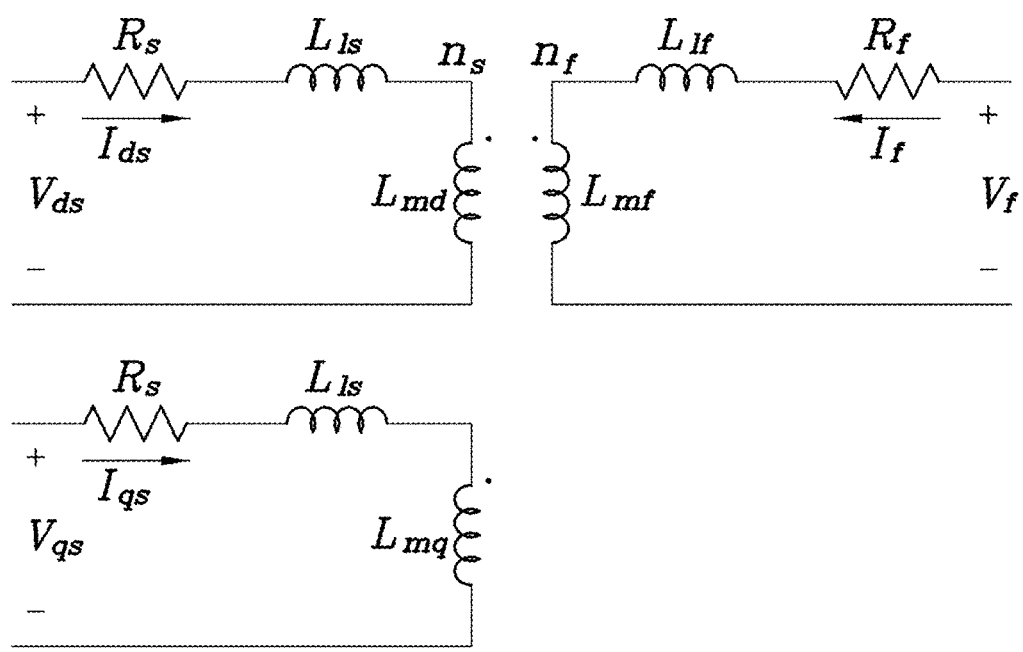
FIGS. 4 and 5 are circuit diagrams illustrating circuits modeling a WRSM applied to various embodiments of the present invention to a d-q model.
Figure 5:
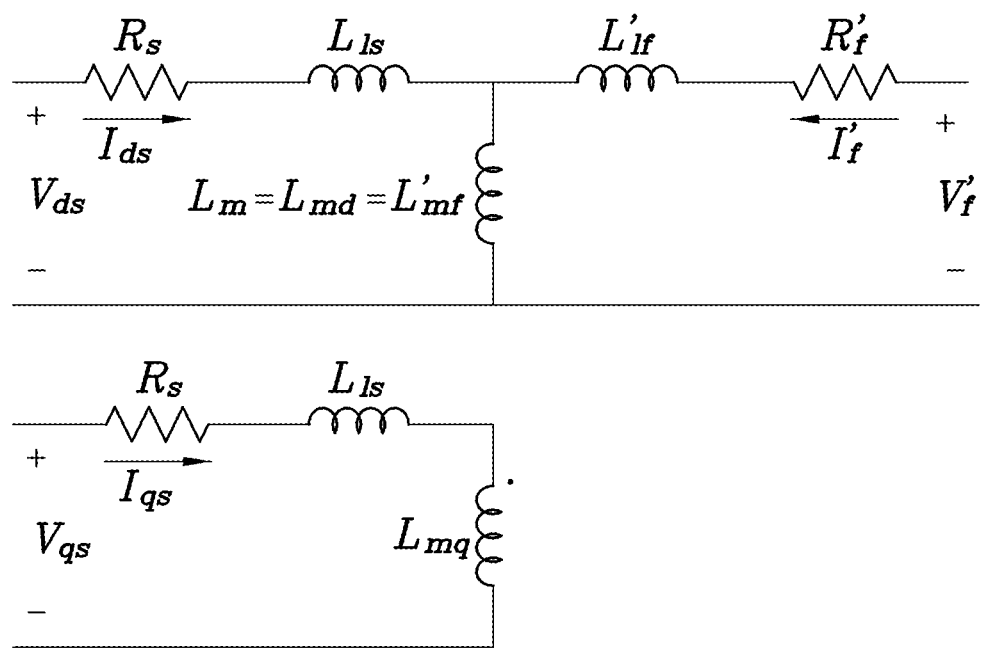

FIGS. 4 and 5 are circuit diagrams illustrating circuits modeling a WRSM applied to various embodiments of the present invention to a d-q model.

As illustrated in FIG. 4, in a WRSM applied to various embodiments of the present invention, three phases at the stator terminal may be modeled to a d-q model and a field coil at a rotor terminal may be modeled to a form of sharing mutual inductance with a coil of a d axis of the d-q modeled stator.

The WRSM modeled as illustrated in FIG. 4 may be converted into an equivalent circuit as illustrated in FIG. 5. When the modeled circuit of FIG. 4 is converted into the circuit illustrated in FIG. 5, converted several parameters are represented using a mark "'", and a value thereof may be expressed by Equation 1 below according to a winding ratio.

$$I'_f = \frac{2}{3}\left(\frac{n_f}{n_s}\right)I_f, \; L'_{mf} = \frac{3}{2}\left(\frac{n_s}{n_f}\right)^2 L_{mf},$$

$$L'_{lf} = \frac{3}{2}\left(\frac{n_s}{n_f}\right)^2 L_{lf}, \; R'_f = \frac{3}{2}\left(\frac{n_s}{n_f}\right)^2 R_f,$$

$$V'_f = \left(\frac{n_s}{n_f}\right)V_f$$

[Equation 1]

Parameters expressed in FIGS. 4 and 5 and Equation 1 are as follows.

$V_{ds}$: d-axis voltage at stator terminal $V_{qs}$: q-axis voltage at stator terminal
$I_{ds}$: d-axis current at stator terminal
$I_{qs}$: q-axis current at stator terminal
$n_s$: Number of turns of coil at stator terminal
$n_f$: Number of turns of coil at field terminal
$R_s$: d-axis and q-axis resistance at stator terminal
$L_{md}$: mutual inductance of d-axis coil at stator terminal
$L_{mq}$: mutual inductance of q-axis coil at stator terminal
$L_{ls}$: d-axis and q-axis leakage inductance at stator terminal
$V_f$: Input voltage at field coil side
$I_f$: Current flowing in field coil
$n_f$: Number of turns of field coil
$R_f$: Resistance at field coil side
$L_{lf}$: Leakage inductance at field coil side
$L_{mf}$: Mutual inductance of field coil
$L_m$ ($=L_{md}=L_{mf}'$): Mutual inductance between d-axis of stator and field coil A grid voltage is applied to the field coil 32 through the full bridge circuit 60 connected to the field coil 32. The applied grid voltage is converted into an equivalent circuit illustrated in FIG. 5, and thus, a magnitude thereof may be adjusted according to a winding ratio. The converted grid voltage $V_f'$ may be expressed by Equation 2 below.

$$V_f' = E_f \sin(\omega_g t) = E_g \frac{n_p}{n_s} \sin(\omega_g t) \qquad \text{[Equation 2]}$$

In Equation 2, $E_g$ is a maximum value of an actual grid voltage, $E_f$ indicates a value obtained by converting $E_g$ by a stator terminal, and $\omega_g$ is an angular velocity of a voltage of the field coil 32, i.e., the grid voltage. Here, the voltages and the currents at the stator terminal and the field coil may be expressed as a sine component and a cosine component as expressed by Equation 3 below.

$$I_f = I_{fs} \sin(\omega_g t) + I_{fc} \cos(\omega_g t)$$

$$V_{ds} = E_{ss} \sin(\omega_g t) + E_{sc} \cos(\omega_g t), \; I_{ds} = I_{dss} \sin(\omega_g t) + I_{dsc} \cos(\omega_g t)$$

$$V_{qs} = 0, \; I_{qs} = 0 \qquad \text{[Equation 3]}$$

Parameters of Equation 3 are as follows.
$I_{fs}$: Magnitude of sine component of current flowing in field coil
$I_{fc}$: Magnitude of cosine component of current flowing in field coil
$E_{ss}$: Magnitude of sine component of voltage applied to field coil
$E_{sc}$: Magnitude of cosine component of voltage applied to field coil
$I_{dss}$: Magnitude of sine component of current of d-axis of stator terminal
$I_{dsc}$: Magnitude of cosine component of current of q-axis of stator terminal Here, in order to make a power factor of the field coil "1", the cosine component $I_{fc}$ of the field current should be 0 and Equation 4 below should be satisfied by the equivalent circuit illustrated in FIG. 8.

$$V_{ds} = R_s I_{ds} + p(L_{ls} I_{ds} + L_m(I_{ds} + I_f'))$$

$$V_f' = R_f' I_f' + p(L_{lf}' I_f' + L_m(I_{ds} + I_f')) \qquad \text{[Equation 4]}$$

In Equation 4, since a voltage corresponding to the field coil is determined by Equation 2, Equation 5 below should be satisfied in a normal state condition.

$$V_f' = R_f' I_f' + p(L_{lf}' I_f' + L_m(I_{ds} + I_f')) \qquad \text{[Equation 5]}$$

$$= R_f' \{I_{fs} \sin(\omega_g t) + I_{fc} \cos(\omega_s t)\} +$$

$$\omega_g (L_g' + L_s)(I_{fs} \cos(\omega_g t) - I_{fs} \sin(\omega_g t)) +$$

$$\omega_g L_m \{I_{dss} \cos(\omega_g t) - I_{dss} \sin(\omega_g t)\}$$

$$= \sin(\omega_g t)\{R_f' I_{fs} - \omega_g L_m I_{dis} - \omega_g (L_{tf}' + L_m) I_{fc}\} +$$

$$\cos(\omega_g t)(R_f' I_{fc} + \omega_g (L_{tf}' + L_m) I_{fs} + \omega_g L_m I_{dis}\}$$

$$= E_f \sin(\omega_g t)$$

In order to satisfy Equation 5, two conditions expressed by Equation 6 and Equation 7 below should be satisfied, and accordingly, a stator current may be obtained.

$$R_f' I_{fc} + \omega_g (L_{lf}' + L_m) I_{fs} + \omega_g L_m I_{dss} = 0 \qquad \text{[Equation 6]}$$

$$I_{dss} = -\frac{R_f' I_{fc} + I_{fs} \omega_g L_f'}{\omega_g L_m} \approx -\frac{L_f'}{L_m} I_{fs}$$

$$R_f' I_{fs} - \omega_g L_m I_{dsc} - \omega_g (L_{lf}' + L_m) I_{fc} = E_f \qquad \text{[Equation 7]}$$

$$I_{dsc} = \frac{R_f' I_{fs} - \omega_g L_f' I_{fc} - E_f}{\omega_g L_m} \approx -\frac{R_f' I_{fs} - E_f}{\omega_g L_m}$$

A sine component and a cosine component of the d-axis of the stator current determined in Equation 6 and Equation 7 are estimated using the fact that a cosine component of the field coil should be 0 ($I_{fs} \approx 0$).

The sine component of the d axis of the current of the stator terminal may be determined according to a sine component of a current of the field coil, i.e., a current for effective power as expressed in Equation 6. Requested input power may be determined as expressed by Equation 8 below.

$$P_{in} = \frac{3}{2}\frac{1}{2}(E_f I_{fs}) = \frac{3}{2}\frac{1}{2}\left(E_g I_{fs} \frac{N_p}{N_s}\right) \Rightarrow I_{fs} = P_{in} / \left\{\frac{3}{2}\frac{1}{2}E_f\right\} \qquad \text{[Equation 8]}$$

In Equation 8, $P_{in}$ indicates an average value of requested input power.

Based on Equation 6 and Equation 8, the sine component of the d-axis of the current of the stator terminal may be determined as expressed by Equation 9, below.

$$I_{dss} = -\frac{L_f' P_{in}}{L_m \left\{\frac{3}{2}\frac{1}{2}E_f\right\}} \qquad \text{[Equation 9]}$$

Also, based on Equation 7 and Equation 8, a cosine component of the d-axis current of the stator may be determined as expressed by Equation 10.

$$I_{dsc} = \frac{R_f' P_{in} / \left\{\frac{3}{2}\frac{1}{2}E_f\right\} - E_f}{\omega_g L_m} \qquad \text{[Equation 10]}$$

Based on Equation 8 to Equation 10, a charging system for a vehicle using WRSM according to various embodiments of the present invention may perform a control operation described with reference to FIGS. 6 to 8.

Figure 6:
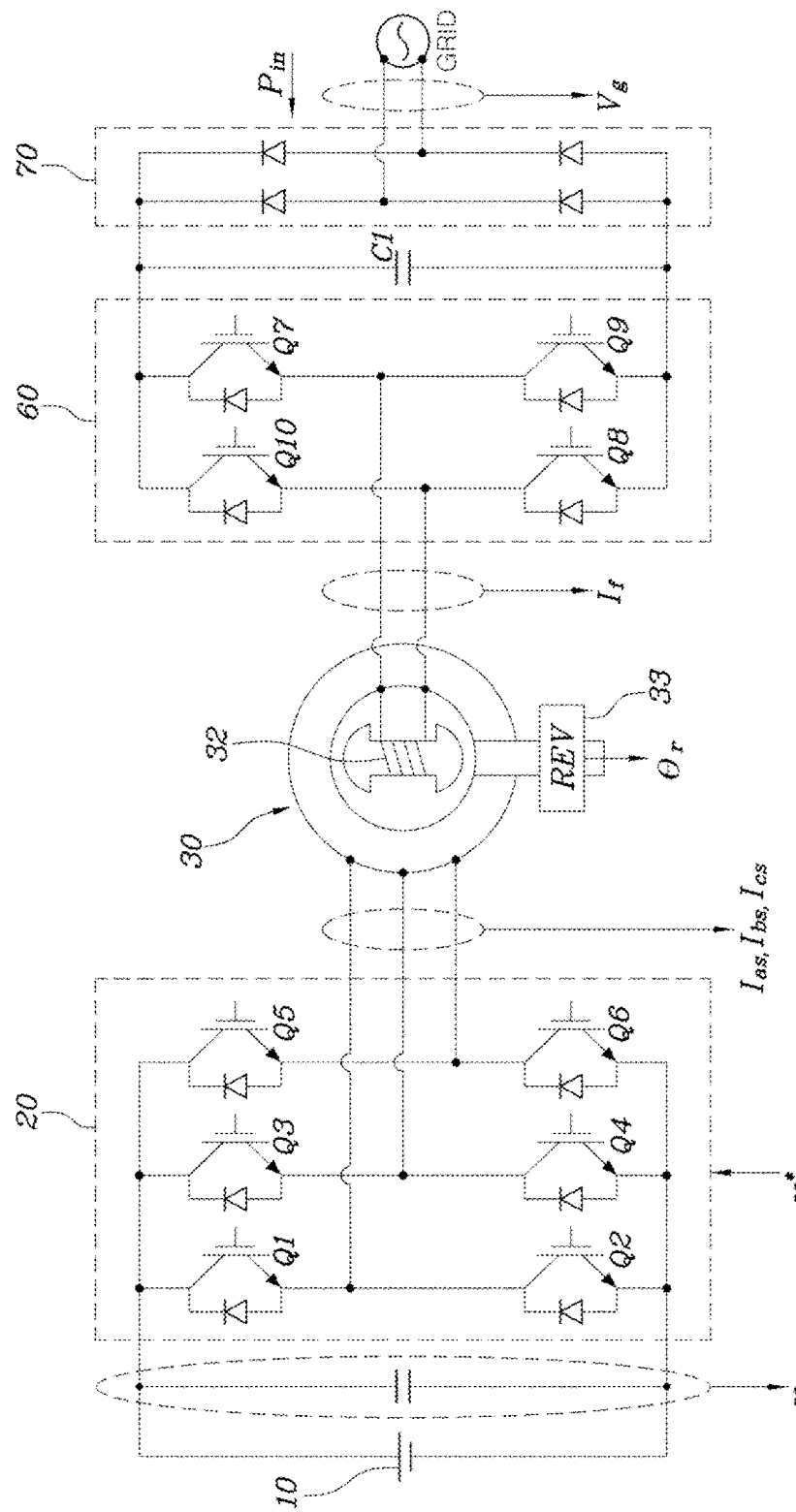
FIG. 6 is a circuit diagram illustrating symbols used to describe a control operation of a charging system using a WRSM according to an embodiment of the present invention.

FIG. 6 is a circuit diagram illustrating symbols used to describe a control operation of a charging system using a WRSM according to an embodiment of the present invention. FIGS. 7 and 8 are control block diagrams illustrating a control operation of a charging system using a WRSM according to an embodiment of the present invention.

As illustrated in FIG. 6, parameters required for controlling the charging system using a WRSM according to an embodiment of the present invention may be obtained through a voltage sensor, a current sensor, or the like, applied to an actually implemented circuit. In embodiments, although in FIG. 6, in order to detect a grid voltage $V_g$, a current $I_f$ provided to the field coil 32, a voltage $V_{dc}$ of the battery 10, and the like, a voltage sensor or a current sensor is installed in an appropriate position of a circuit and controlling may be performed by values obtained from the voltage sensor or the current sensor.

A control scheme described hereinafter may be performed by the controller 50 described to control the switching unit 40 in various embodiments of the present invention. The controller 50 may be implemented by hardware in a form including a processor and a memory, and may store several parameters in the memory as necessary, or the processor may perform calculation according to a previously programmed algorithm using several parameters stored in an external sensor or the memory.

First, a control method illustrated in FIG. 7 will be described.

As described above, parameters required for controlling are detected, and other parameters may be calculated from some of the detected values. For example, a phase angle $\theta_g$ and an angular velocity $\omega_g$ of grid power may be derived from a grid voltage $V_g$ detected using a phase loop lock (PLL) circuit and a maximum value $E_g$ of the grid voltage $V_g$ may be derived, and the maximum value $E_g$ of the grid voltage $V_g$ may be converted into "$E_f$" through equivalent circuit conversion as illustrated in FIG. 5 and the value thereof may be derived.

Also, a sine component $I_{fs}$ and a cosine component $I_{fc}$ of an input current may be calculated from the input current $I_f$ and the angular velocity $\omega_g$ input to the field coil 32 by applying a heterodyning method.

When a battery management system (BMS) or a DC link voltage controller of a vehicle receives the voltage $V_{dc}$ of the battery 10 and outputs a charge power reference value $P^*_{dc}$ for charging the battery 10, an error with respect to actual supply power $P_{dc}$ to the battery 10 that may be calculated by a magnitude of a voltage/current actually provided to the battery 10 may be calculated and an input power reference $P^*_{in}$ from a grid able to remove the error may subsequently be calculated by a control method such as proportional integral control, or the like.

Thereafter, as a value corresponding to three-fourths (¾) of the voltage maximum value $E_f$ is divided by the input power reference $P^*_{in}$, a sine component $I^*_{fs}$ of a reference value regarding a current input to the field coil 32 is derived.

An error between the sine component $I^*_{fs}$ of a reference value regarding a current input to the field coil 32 and a sine component $I_{fs}$ actually input to the field coil 32 is calculated, and a sine component $I^*_{dss}$ of a d-axis current reference value of the stator terminal able to remove the error by a control method such as proportional integral (PI) control, or the like, may be derived by Equation 6.

Since a cosine component $I^*_{fc}$ of the reference value regarding a current input to the field coil 32 should be 0, after an error of the cosine component $I_{fc}$ of a current input to the field coil 32 is calculated, a cosine component $I^*_{dsc}$ of the d-axis current reference value able to remove the error by the control method such as PI control, or the like, may be derived by Equation 7.

A d-axis current reference value $I^*_{ds}$ of the stator terminal is derived by Equation 3 by applying a sine component and a cosine component of the d-axis current reference value of the stator terminal, and a d-axis voltage reference value $V^*_{ds}$ and a q-axis voltage reference value $V^*_{qs}$ of the stator terminal may be derived by applying a method such as proportional resonant control, or the like, to the derived d-axis current reference value $I^*_{ds}$ and the q-axis current reference value $I^*_{qs}$ having a value 0 of the stator terminal.

Thereafter, when the d-axis voltage reference value $V^*_{ds}$ and the q-axis voltage reference value $V^*_{qs}$ of the stator terminal are converted into 3-phase voltage by using the rotor angle $\theta_r$ detected by a resolver 33 provided in the WRSM, a 3-phase voltage reference value $V^*_{abcs}$ may finally be derived.

In this manner, by controlling ON/OFF duty of each of the switching elements Q1 to Q6 provided within the inverter 20 to output the derived 3-phase voltage reference value $V^*_{abcs}$, desired battery charge power may be controlled to be supplied to the battery.

Next, a control method illustrated in FIG. 8 will be described.

Figure 7:
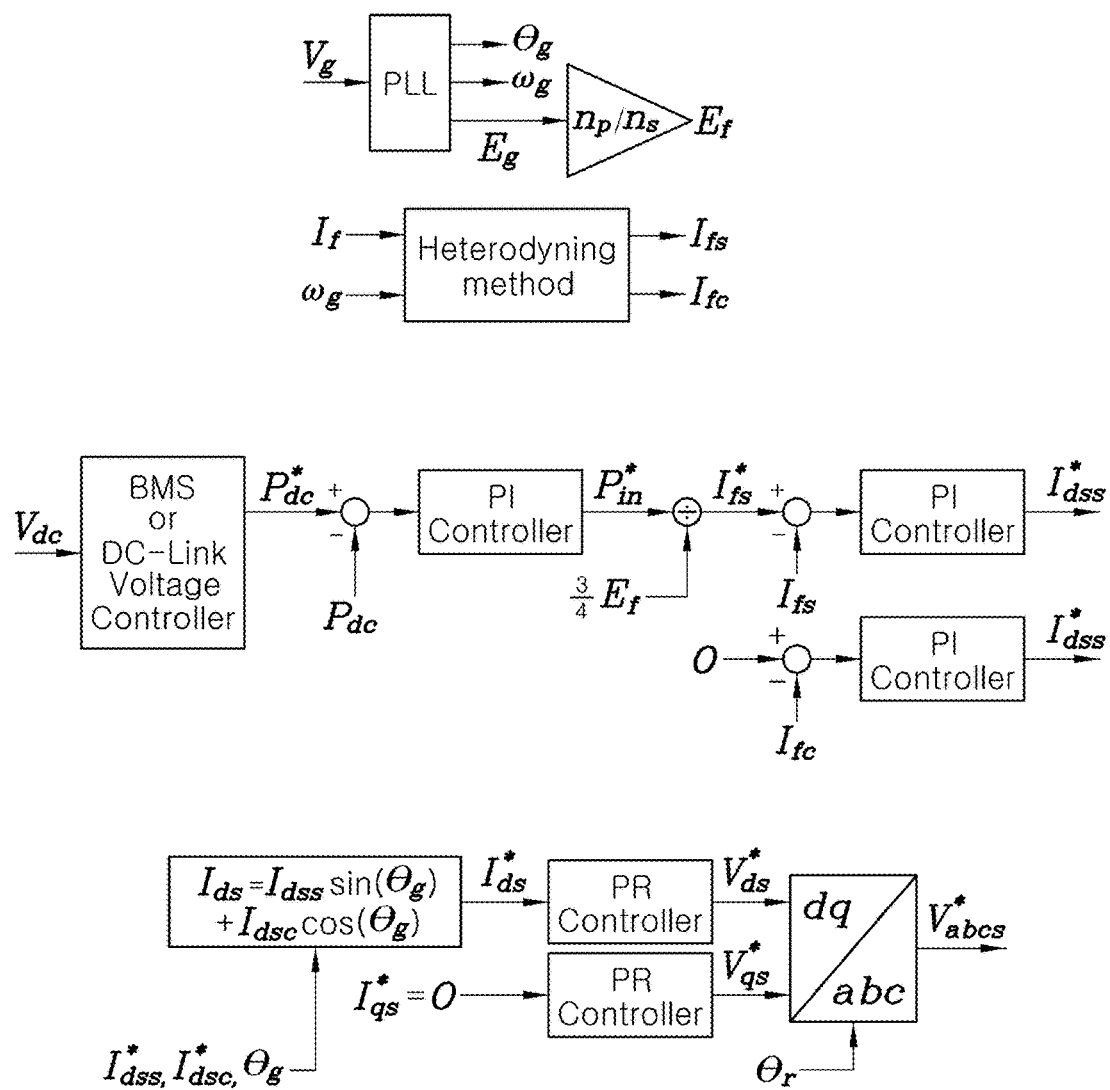
FIGS. 7 and 8 are control block diagrams illustrating a control operation of a charging system using a WRSM according to an embodiment of the present invention.
Figure 8:
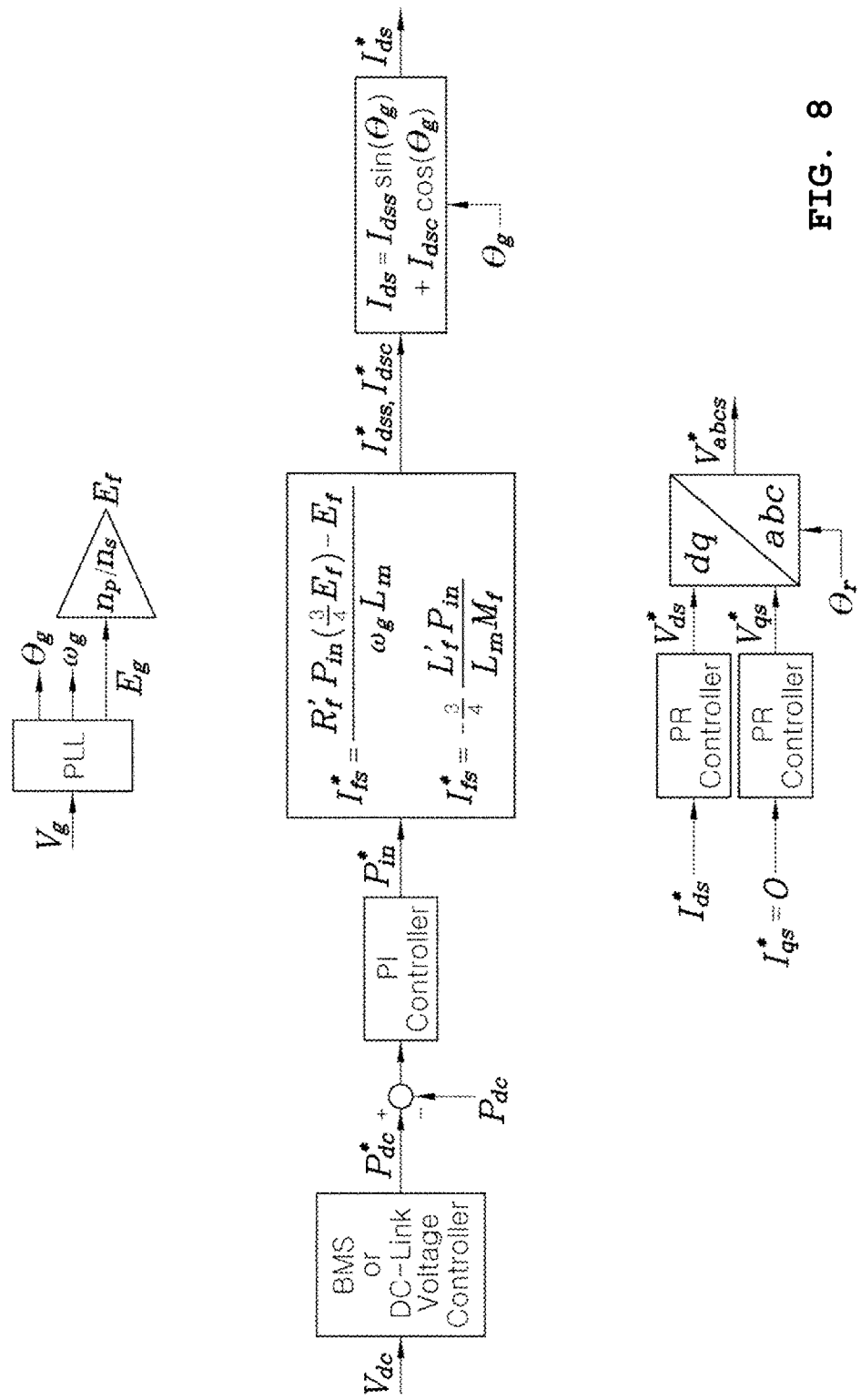

In the control method illustrated in FIG. 8, after an input power reference $P^*_{in}$ from a grid is calculated in the same manner as that described above with reference to FIG. 7, a sine component $I^*_{dss}$ and a cosine component $I^*_{dsc}$ of a d-axis current reference value of the stator terminal may be calculated by directly applying Equation 9 and Equation 10 to the input power reference $P^*_{in}$, without applying a PI control method.

After the sine component $I^*_{dss}$ and the cosine component $I^*_{dsc}$ of the d-axis current reference value at the stator terminal are calculated, a 3-phase voltage reference value $V^*_{abcs}$ is derived in the same manner as that of the method of FIG. 7 to control the switching elements Q1 to Q6 of the inverter 20.

As described above, in the various embodiments of the present invention, when the WRSM provided in a vehicle is rotatably driven, the field coil is driven by connecting a switching circuit (inverter circuit) for driving the field coil to the battery as in a case where a general motor is driven. Meanwhile, in a charge mode for charging the battery, the battery connected to the stator coil may be charged with power from the grid through the field coil by controlling the switch unit (relay) to an OFF state. Since the field coil is regarded as a coil forming mutual inductance with a coil of a stator to form a transformer in a motor stop state, when a driving circuit of the field coil is separated from the battery by using a circuit such as a relay, or the like, insulating characteristics may be obtained. This matches up to requirements of the on-board charger that prefers having insulation characteristics with a grid for the purpose of safety.

In this manner, in the various embodiments of the present invention, since the on-board charger circuit and the circuit required for the WRSM including the field coil, which have been separately used, are integrated, the system may be simply configured.

Thus, various embodiments of the present invention may implement an on-board charger in a plug-in hybrid vehicle using the WRSM at low cost and through simple configuration.

Figure 9:
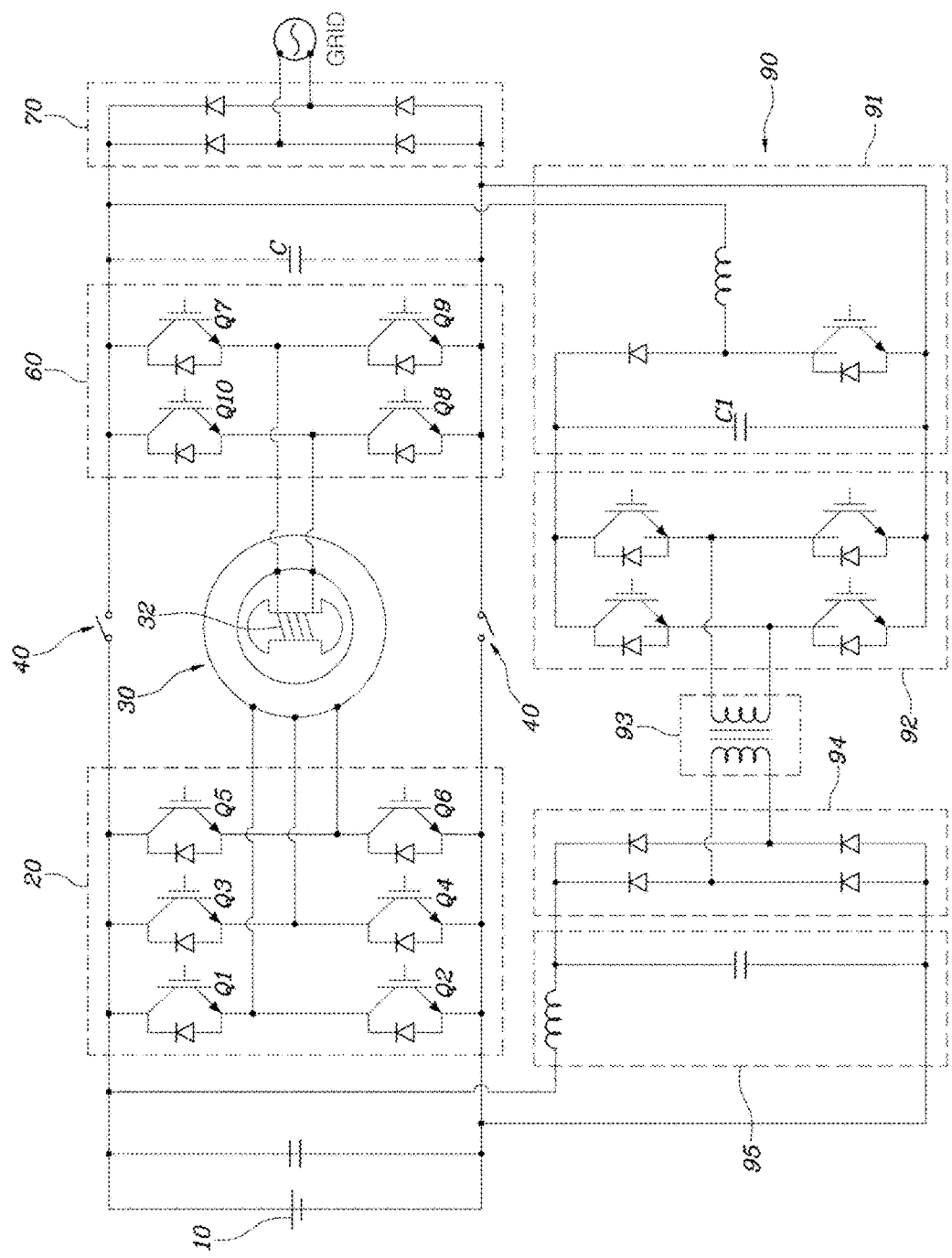
FIG. 9 is a circuit diagram illustrating a charging system using a WRSM according to another embodiment of the present invention, specifically illustrating a structure in which a general charge circuit is connected in parallel to the embodiment illustrated in FIG. 1.

FIG. 9 is a circuit diagram illustrating a charging system using a WRSM according to another embodiment of the present invention, specifically illustrating a structure in which a general charge circuit is connected in parallel to the embodiment illustrated in FIG. 1.

As illustrated in FIG. 9, in another embodiment of the present invention, a general on-board charging circuit 90 is added in parallel between a grid of the charging system using such a WRSM as that described above with reference to FIGS. 1 to 8 and the battery 10. In embodiments, the on-board charging circuit 90 including a power factor compensation circuit unit 91 connected to a rectifying unit 70 connected to the grid, a bridge circuit unit 92 converting an output from the power factor compensation circuit unit 91 into AC power of a high frequency, a transformer unit 93 converting an output from the bridge circuit unit 92 and insulating an input/output terminal, a rectifying unit 94 converting AC power converted and output from the transformer unit 93 into DC power, and a filter unit 95 filtering a converted output from the rectifying unit 94 and providing the same to the battery may be connected in parallel between the battery 10 and the grid.

In this embodiment, in the case of driving a vehicle, the controller 50 controls the switching unit 40 to an ON state (connection state) so that the WRSM 30 may receive a voltage from the battery 10 and all the stators 31*a*, 31*b*, and 31*c* and the field coil 32 may be driven. Also, in the case of charging the battery 10, the controller 50 controls the switch unit 40 to an OFF state (open state) to make the field coil 32 insulated from the battery 10 so as to prevent charging power from being supplied to the battery through the field coil. Also, when the grid is connected, the WRSM 30 may be controlled to a charge mode to charge the battery 10, and the battery may also be charged through the additional on-board charging circuit 90 connected in parallel. Here, the controller 50 may flexibly control charge power provided to the battery 10 by the WRSM and charge power provided to the battery 10 by the on-board charging circuit 90.

In another example, in the case of general slow charging of the battery 10, the controller 50 may control the switch unit 40 to an OFF state to maintain an insulated state between the battery 10 and the grid, control the WRSM 30 not to operate in a charge mode, and cause the battery 10 to be charged through the general on-board charging circuit 90. Since the on-board charging circuit 90 is able to be designed as a highly efficient circuit optimized for charging a battery, it may perform charging with high efficiency, compared with a case in which the WRSM operates in the charge mode. Meanwhile, in a case in which fast charging is required during slow charging, the controller 50 may maintain the OFF state of the switch unit 40 and appropriately control the inverter 20 and the inverter 20 and the inverter 60 adjacent to the field coil 32 to additionally transfer power to the battery 10 also through the WRSM 30.

In this manner, in an embodiment of the present invention, since the general on-board charging circuit 90 is added to the battery charging system using the WRSM 30, highly efficient charging is performed through the charging circuit 90 in the case of general charging, and when fast charging is required, the WRSM 30 is controlled to a charge mode to expand charge capacity without any other additional circuit, and charge power provided through the WRSM 30 and charge power provided through the charging circuit 90 may be selectively controlled.

As described above, in the charging system using the WRSM, in the case of rotatably driving the WRSM provided in a vehicle, the switching circuit (inverter circuit) for driving the field coil is connected to the battery to drive the field coil as in generally driving a motor, and in a charge mode for charging the battery, the switch unit (relay) is controlled to an OFF state to charge power from the grid to the battery connected to the stator coil side through the field coil, thereby eliminating the need to prepare a separate on-board charging circuit, and thus, a battery of a plug-in hybrid vehicle using the WRSM may be charged at low cost and with a simple configuration.

Also, in the charging system using the WRSM, by adding an on-board charging circuit to the charging system using the WRSM, a charge capacity may be increased. Also, in the charging system using a WRSM, in the case of general charging, highly efficient charging is performed through the charging circuit, and in the case of requiring fast charging, the WRSM is controlled to a charge mode, thereby expanding a charge capacity without using any additional circuit.

In embodiments, a hybrid or electric vehicle includes a battery and a wound rotor synchronous motor (WRSM) 30 for propulsion. When the WRSM 30 is not used for propulsion, the vehicle uses the WRSM 30 for charging the battery 10. The vehicle includes a battery charging system or battery charger including the WRSM 30. The WRSM includes stator coils 31*a*, 31*b* and 31*c* and a rotor field coil 32. The battery charging system further includes a first inverter circuit 20 connected to the battery 10 and the stator coils 31*a*, 31*b* and 31*c* and a second inverter circuit 60 connected to the rotor field coil 32. The battery charging system includes a switch circuit configured to selectively connect the second inverter circuit to either the battery 10 or an electric power grid or electrical grid. For this, the switch circuit includes one or more switches 40 between the battery 10 and the second inverter circuit 60. The switch circuit further includes a switch for controlling connection between the second inverter circuit 60 and the grid.

In embodiments, when the second inverter circuit 60 is connected to the battery 10, the WRSM 30 receives electric power from the battery 10 and operates for propulsion of the vehicle. When the second inverter circuit 60 is connected to the grid, the electric power from the grid is transferred to the battery 10 through the second inverter circuit 60, the rotor field coil 32, the stator coils 31*a*, 31*b* and/or 31*c*, and the first inverter circuit 20 for charging the battery 10. When charging the battery 10, the rotor field coil 32 and the stator coils of the WRSM 20 form mutual inductance for transfer electric power.

In embodiments, a controller 50 controls the switch circuit. In one embodiment, when the controller 50 detects or receives a signal indicative of that the battery charging system of the vehicle is connected to the grid, the controller 50 causes the switches 40 to disconnect the connection between the battery and the second inverter circuit such that the WRSM 30 does not operate for propulsion of the vehicle. Further, in one embodiment, only when the controller 50 detects or receives a signal indicative of that the battery charging system of the vehicle is disconnected to the grid, the controller 50 connects the switches 40 for operating the motor 20 for propulsion of the vehicle.

Although embodiments of the present invention has been shown and described, it will be obvious to those skilled in the art that embodiments of the present invention may be variously modified and altered without departing from the spirit and scope of the present invention as defined by the following claims.

What is claimed is:

1. A charging system using a wound rotor synchronous motor (WRSM), the charging system comprising:

an inverter configured to convert power of a battery into alternating current (AC) powers having a plurality of different phases;

a WRSM having a plurality of stator coils each receiving AC power of a different phase and a field coil forming mutual inductance with the plurality of stator coils and installed in a rotor to form a magnetic flux using power of the battery; and a controller configured to control the connection between the battery side and the field coil side to be disconnected from each other in a charge mode in which grid power is applied to the field coil side of the WRSM.

2. The charging system of claim 1, wherein, in the case of rotatably driving the WRSM, the controller is configured to control the battery and the field coil to he electrically connected.

3. The charging system of claim 1, wherein, in the charge mode, the controller is configured to control the battery side and the field coil side to be disconnected from each other so as to prevent charging power from being supplied to the battery through the field coil, and further configured to control the inverter to allow the grid power to be transferred from the field coil to the plurality of stator coils to charge the battery.

4. The charging system of claim 1, wherein,
in the charge mode,
the controller is configured to:
derive a charge power reference value for charging the battery with reference to a voltage of the battery,
derive an input power reference value on the basis of an error between supply power actually supplied to the battery and the power reference value,
derive a sine component of an input current reference value input to the field coil by applying a maximum grid voltage value to the input power reference value,
derive a sine component of a d-axis current reference value of the stator coil side on the basis of an error between the input current reference value and the sine component of the actually input current and derives a cosine component of the d-axis current reference value of the stator coil side on the basis of an error between 0 and a cosine component of a current input to the field coil,
derive a d-axis current reference value of the stator coil side on the basis of the sine component and the cosine component of the d-axis current reference value of the stator coil side and a phase angle of the grid power,
derive a d-axis voltage reference value and a q-axis voltage reference value of the stator cod side on the basis of the d-axis current reference value and a q-axis current reference value of the stator coil side having a value 0,
derive a 3-phase voltage reference value V*abcs by converting the d-axis voltage reference value and the q-axis voltage reference value, and
control an ON/OFF duty of a switching element of the inverter to output the 3-phase voltage reference value V*abcs.

5. The charging system of claim 1, wherein,
in the charge mode,
the controller is configured to:
derive a charge power reference value for charging the battery with reference to a voltage of the battery,
derive an input power reference value P*in on the basis of an error between supply power actually supplied to the battery and the power reference value, calculate a sine component I*dss and a cosine component I*dsc of the d-axis current reference value of the stator coil side using a following equation, $$I_{dss} = -\frac{L'_f P_{in}}{L_m\left\{\frac{3}{2}\frac{1}{2}E_f\right\}},$$ [Equation]

$$I_{dsc} = \frac{R'_f P_{in} / \left\{\frac{3}{2}\frac{1}{2}E_f\right\} - E_f}{\omega_g L_m}$$

where $L'_f = (3/2) * (n_s/n_f)^2$, $n_s$: number of turns of the field coil, Lm: mutual inductance between d-axis of the stator and the field coil viewed from the stator side, $E_f$: converted value obtained by converting a maximum voltage value of the grid into the stator terminal, and $\omega_g$ is an angular velocity of grid power, derive a d-axis current reference value of the stator coil side on the basis of the sine component and the cosine component of the d-axis current reference value of the stator coil side and the phase angle of the and power, derive a d-axis voltage reference value and a q-axis voltage reference value of the stator coil side on the basis of the d-axis current reference value and the q-axis current reference value of the stator coil side having a value 0, derive a 3-phase voltage reference value V*abcs by converting the d-axis voltage reference value and the q-axis voltage reference value into a 3-phase voltage, and control and ON/OFF duty of a switching element of the inverter to output the 3-phase voltage reference value V*abcs.

6. The charging system of claim 1, further comprising:
a rectifying circuit unit configured to rectify the grid power and a switching circuit unit configured to convert an output from the rectifying circuit unit into an alternating current (AC) signal having a predetermined frequency and providing the converted AC signal to the field coil.

7. The charging system of claim 1, wherein the grid power is directly applied to both ends of the field coil.

8. The charging system of claim 1, further comprising:
a power factor compensation circuit unit configured to compensate for a power factor of the grid power; and
a switching circuit unit configured to convert an output from the power factor compensation circuit unit into an AC signal having a predetermined frequency and providing the convened AC signal to the field coil.

9. A charging system using a wound rotor synchronous motor (WRSM), the charging system comprising:
an inverter selectively operated to convert power of a battery to output a plurality of alternating current (AC) powers having different phases or to convert a plurality of AC powers to output power to the battery;
a WRSM having a plurality of stator coils configured to receive a plurality of phases of AC power from the inverter and a field coil installed in a rotor to form mutual inductance with the plurality of stator coils;
a switch unit configured to selectively electrically connect or disconnect the battery and the field coil; and
a controller configured to control ON/OFF state the switch unit,
wherein, in the case of driving the WRSI, the controller is configured to adjust the switch unit to an ON state to drive the WRSM using a magnetic flux generated in the field coil by power from the battery, and in the case of charging the battery by applying grid power to the field coil, the controller is configured to adjust the switch unit to an OFF state to allow the grid power to be transferred to the stator coil from the field coil.

10. The charging system of claim 9, wherein, in the case of charging the battery, the controller is configured to control a plurality of switching elements included in the inverter to provide power to the battery.

* * * * *